Figure 1:
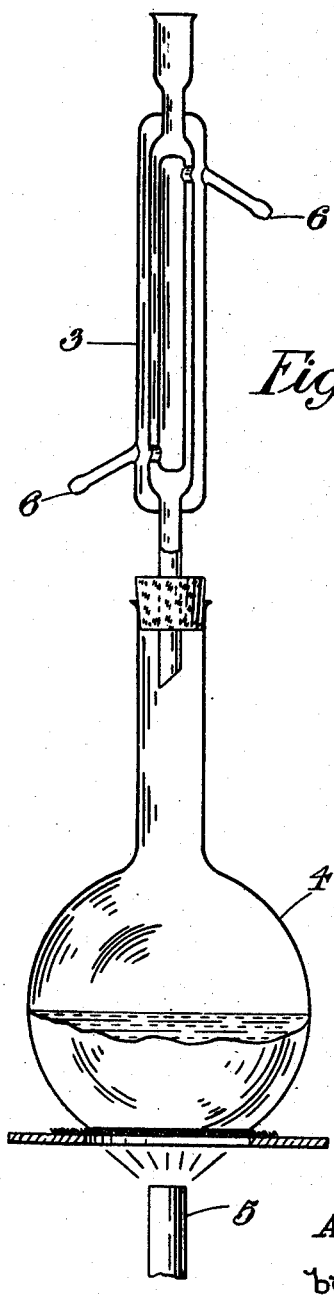

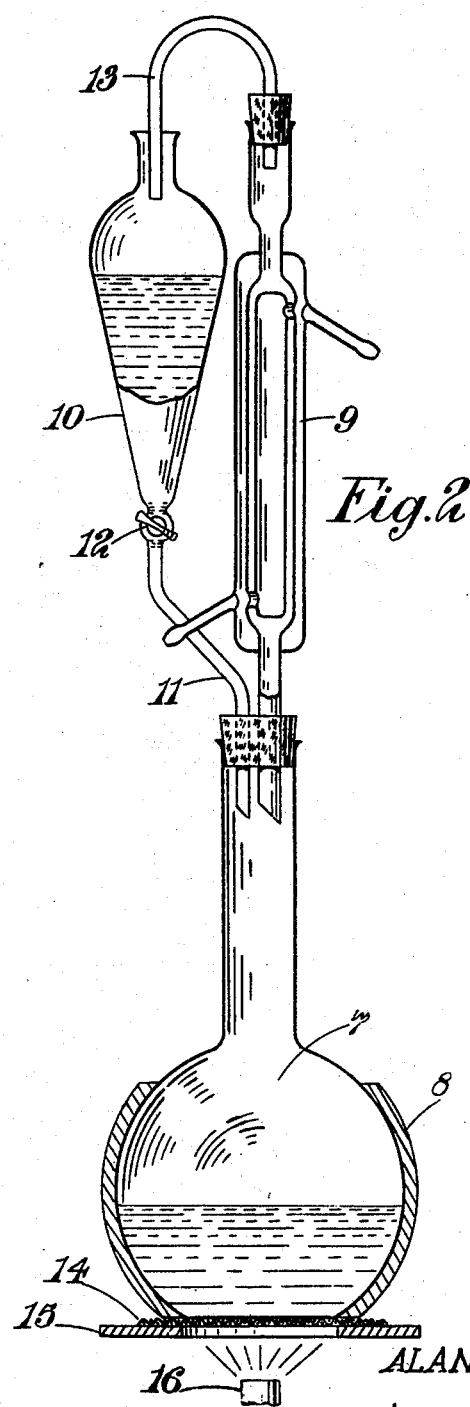

Patented Sept. 26, 1950

2,523,730

UNITED STATES PATENT OFFICE 2,523,730

JOINTING COMPOUNDS AND PROCESSES FOR THE PRODUCTION THEREOF

Alan Thomas Barrington Parkhurst Squires, Allenton, England, assignor to Rolls-Royce Ltd., Derby, England, a British company Application February 23, 1949, Serial No. 77,792
In Great Britain March 1, 1948

3 Claims. (Cl. 106—249)

This invention comprises improvements in or modifications of the jointing substance and the processes for its preparation described and claimed in co-pending United States Patent application Serial No. 692,898 filed August 24, 1946.

In that specification there is described a new jointing substance prepared by the addition of sulphur to a fatty oil, the amount of sulphur comprising 10 to 43% and preferably 10 to 26% by weight of the mixture, heating the mixture at a temperature between 220° C. and 240° C., maintaining the temperature for from 2 to 5 minutes so as to produce a vulcanised base, dissolving or dispersing said base in an organic solvent therefor chosen from the group consisting of toluene, xylene and solvent naphtha and dissolving the resultant mass in an oxygenated organic aliphatic solvent of the group consisting of methyl acetate, ethyl acetate, butyl acetate, amyl acetate and acetone, thereby to produce a jointing substance which is of a flowable nature permitting its application to the surface to be treated, whilst subsequent evaporation of said volatile medium produces a jointing medium of a tacky nature. The fatty oils employed are preferably castor oil or cod liver oil or mixtures of these oils but other fatty oils, such as linseed oil, cottonseed oil or rape oil, may of course be also employed.

The jointing substance prepared by this process may be applied to surfaces to be joined with a brush, and, after the solvent has evaporated, the jointing substance remains plastic and pliable when exposed for long periods to temperatures up to the melting point of the substance and moreover it is resistant to the action of lubricating oils and fuels.

The use of the jointing substance in internal combustion engines offers particular advantages since the jointing medium remains plastic and pliable when exposed for long periods to temperatures up to the melting point of the composition and since moreover the base is resistant to the action of lubricating oils and fuels. Such a jointing substance may be used without the use of a joint washer.

It has been found that the viscosity of the jointing substance increases the longer it is stored before use, the rate of increase of viscosity being less, the lower the initial viscosity of the freshly prepared substance.

The viscosity of the jointing substance may be reduced in accordance with the invention, by adding to the solvent for the vulcanised base or to a jointing substance, a small amount of an agent to reduce the viscosity of the jointing substance.

Suitable agents for this purpose are benzyl alcohol and cyclohexanol.

The preparation of jointing substances in accordance with the present invention will now be described.

100 parts by weight of castor oil are mixed with 20 parts by weight of sublimated sulphur (flowers of sulphur), and the mixture so produced is carefully heated, with continuous stirring, to 220° C. at which temperature a reaction takes place. Whilst this reaction is in progress the temperature of the mixture is allowed to rise to 226° C. and it is maintained at this temperature with continuous stirring for a period of from 2 to 5 minutes. It is preferable not to heat the mixture for much longer periods than 5 minutes at this stage.

The mixture may then be allowed to cool and throughout this stage of the process it is continuously stirred until its temperature falls below about 200° C. The mixture is then poured into shallow tinned iron trays and allowed to cool to room temperature, the product being a translucent reddish-brown rubber-like elastic mass.

The vulcanised base thus obtained may be brought into a condition suitable for use as a jointing substance by treating the composition with toluene or xylene or solvent naphtha or mixtures of any two or all of these solvents to convert it to a jelly and then dissolving the jelly in a second organic solvent to form a solution or dispersion which is readily capable of being applied to the joint by means of a brush.

For convenience in describing the above conversions in detail the composition obtained by heating the sulphur and fatty oil mixture will be referred to as "vulcanised base," the solution applied to the surfaces to be joined together will be referred to as "the jointing substance," and the material obtained by evaporation of the organic solvents from the jointing substance will be referred to as "the jointing medium." The latter possesses the same properties as the vulcanised base with the additional property of being very sticky or tacky. Thus, if two metal plates are coated with the jointing substance and pressed together and then pulled apart, the medium elongates to numerous threads showing that it possesses the properties of flowability and adhesion which it is considered necessary for a jointing medium to possess if it is to function satisfactorily as a sealing medium.

The vulcanised base, prepared as described, melts at 195° C. but does not harden when heated for long periods at temperatures below its melting point and it is entirely resistant to the action of lubricating oil and fuel.

The action of various organic solvents towards the base is as follows:

| Solvent | Behaviour of Base |
|---|---|
| Methylated Spirit | Insoluble. |
| Trichlorethylene | Do. |
| Carbon Tetrachloride | Do. |
| Methyl Acetate | Do. |
| Ethyl Acetate | Do. |
| Butyl Acetate | Do. |
| Amyl Acetate | Do. |
| Acetone | Do. |
| Benzene | Do. |
| Toluene | Soluble. |
| Xylene | Do. |
| Solvent Naphtha | Do. |

The word "insoluble" is here used in a broad sense, inasmuch as it covers those instances where the product is only partially or slightly soluble in the solvent in addition to the instances where it is entirely insoluble. The word "soluble" is used to cover an action which may be the forming of a true molecular solution, a colloidal solution or a colloidal dispersion.

Although the base is capable of being dissolved in toluene, xylene and solvent naphtha these solvents are not sufficiently volatile to ensure rapid drying of the compound when applied to the joint face. However, it has been found that if the vulcanised base be first mixed with one of these three solvents in sufficient quantity it will form a jelly which is soluble in many of the solvents in which the base alone is insoluble. For example, when 132 parts by weight of the base are added to 100 parts by weight of toluene and the resultant mix boiled under reflux a homogeneous solution is obtained in about 12 hours. Upon cooling the solution sets to a soft jelly. A suitable laboratory apparatus for boiling the base-toluene mixture under reflux is diagrammatically shown in Figure 1 of the accompanying drawing. The apparatus comprises a double-wall condenser 3, a flask 4 to receive the mixture and a source of heat (such as the gas burner 5) for the flask 4. A stream of coolant enters and leaves the condenser 3 by conduits 6.

The action on various organic solvents towards the jelly is as follows:

| Solvent | Behaviour of Jelly |
|---|---|
| Methylated Spirit | Insoluble. |
| Methyl Acetate | Soluble. |
| Ethyl Acetate | Do. |
| Butyl Acetate | Do. |
| Amyl Acetate | Do. |
| Acetone | Do. |

It is clear from the above table that there is considerable latitude in the choice of a solvent which may be used for thinning the jelly to the required consistency for application to the joint face.

It is preferred, however, when the solution is intended as a jointing substance for use with internal-combustion engines, to use as a thinner acetone.

When acetone is employed as the thinner, the solution and the vapours arising from it are inflammable.

Although in the above description reference is made to the jelly obtained upon cooling the solution of the base in toluene, it is to be understood that there is no necessity for cooling this solution prior to the addition of thinner. Thus, the thinners may be added to the solution while it is hot and still in the liquid state.

A suitable laboratory apparatus by which the cold toluene may be added to the molten castor oil-sulphur product is diagrammatically shown in Figure 2 of the accompanying drawing. Referring to this figure the apparatus is shown as comprising a flat-bottomed flask 7 the side wall of which is lagged with asbestos or other heat insulating material as at 8. Connected with the flask is a double-wall condenser 9 and a funnel 10, the latter being in communication with the flask by a pipe 11 incorporating a tap 12. The funnel 10 and condenser 9 are connected together by a pipe 13 and as is clear from Figure 2 the pipe 13 is a close fit into the upper part of the condenser 9 whilst the other end passes into and just below the neck of the funnel 10. The latter is open to atmosphere.

The assembly described rests upon a piece of wire-gauze 14 which covers a circular hole in the centre of an asbestos sheet 15. The latter is suitably supported above a gas burner 16 and the arrangement is that the diameter of the hole in sheet 15 is slightly larger than the diameter of the flat-bottom of the flask 7.

With the apparatus described the following procedure is adopted: The castor oil is introduced to the flask 7 (the condenser 9 and funnel 10 having previously been removed) and the gas burner 16 is lit so that the temperature of the oil is raised to 190° C. Thereafter, the sulphur is introduced and this causes the temperature to fall to about 170° C. Thereafter the mixture is heated slowly at the rate of approximately 2° C. per minute with constant gentle agitation until a temperature of 226° C. is reached. This temperature is then maintained for a duration of 3 to 5 minutes at the end of which time the condenser and funnel assembly is connected to the flask 7 and the toluene which has previously been introduced into the funnel 10 is run on to the hot mass within the flask 7 as quickly as possible by fully opening the tap 12. The toluene, immediately it reaches the molten mass within the flask, vaporises rapidly and condenses in the condenser 9, but the small increase in pressure developed in the flask 7 as a consequence forces the condensate in the condenser through the pipe 13 and into the funnel 10 from whence it descends into the flask 7. This cycle repeats itself rapidly until ultimately after about 30 seconds all the toluene from the funnel 10 is in the flask 7 whereupon the tap 12 is closed.

With the procedure described the castor oil-sulphur product dissolves almost instantaneously in the toluene and it is believed that this is largely due to the small time interval during which the toluene is initially in contact with the hot mass in the flask 7 before vaporisation begins.

Having introduced the toluene to the flask as described the mixture is next boiled for a period of 30 minutes and then after being allowed to cool to approximately 50° C. the required amount of thinner is added to the mixture within the flask 7 from the funnel 10. It will be appreciated that this thinner has previously been introduced to the funnel 10 whilst the tap 12 remains closed. After the thinner has been introduced to the flask 7 the mixture is boiled for a further period of 30 minutes and at the end of this time it is allowed to cool to room temperature whereupon it is transferred to suitable storage vessels which should be well sealed.

It is to be noted that the castor oil may be heated as quickly as possible to 190° C. prior to the introduction of sulphur but that once this addition has been made it is important that the mixture be heated at a controlled rate. Heating from 170° C. to 220° C. over a period of 20 to 25 minutes has generally been found satisfactory. If the mixture be heated too quickly at this stage, there is a tendency for it to froth copiously with loss of sulphur the resulting compound then produced being found unsatisfactory. It is important for the same reason that the mixture be heated at 226° C. for not longer than 5 minutes.

It has been found that the rate of heating after the addition of sulphur, and the duration of heating at 226° C. becomes of less importance when larger quantities of the compound are being prepared. The times quoted are to be understood therefore as applying to the specific apparatus shown in Figure 2 in which the flask 7 has a capacity of 3 litres and the funnel 10 a capacity of 500 ccs.

The purpose of lagging the flask 7 as at 8 is to prevent the formation of a thin layer of undissolved castor oil-sulphur product which would otherwise solidify to the side of the flask during the addition of the toluene.

It will be appreciated, of course, that a plant based upon the principles of production described with reference to Figure 2 may be designed for industrial manufacture of the compound.

From the foregoing it will be clear that a preferred jointing substance is obtained from a base prepared by heating sulphur with castor oil, the base being subsequently heated with toluene to form a jelly which is diluted with acetone to produce a substance readily capable of application to the joint faces by a brush.

Although in the description above reference is only made to castor oil it is to be understood that other fatty oils may be combined with sulphur to give similar rubber-like elastic compositions the properties of each of which depends to a considerable extent upon the oil which is used.

It has been found that the viscosity of the jointing substance increases the longer it is stored before use, the rate of increase of viscosity being less the lower the initial viscosity of the freshly prepared substance. In order therefore further to reduce the initial viscosity of the jointing substance produced by the above methods, thereby to increase its storage life, a suitable viscosity-reducing agent may be added to the jointing substance either as the last step in the preparation of the jointing substance or in admixture with the solvent for the vulcanised base or the thinner for the jelly. For example 2% by weight of benzyl alcohol may be added or alternatively a small proportion of cyclohexanol may be added to produce the initial viscosity of the jointing substance.

I claim:

1. A process for the preparation of jointing composition, which process comprises adding sulphur to a fatty oil, the sulphur comprising 10% to 43% by weight of the mixture, heating the mixture at a temperature between 220° and 240° C., maintaining the temperature for from 2 to 5 minutes to produce a vulcanized base, dissolving or dispersing the base in a volatile organic solvent chosen from the group consisting of toluene, xylene and solvent naphtha, dissolving the resultant mass in an oxygenated organic, aliphatic solvent of the group consisting of methyl acetate, ethyl acetate, butyl acetate, amyl acetate, and acetone for thinning the same to the desired consistency for the jointing composition, and adding thereto an organic oxygenated hydro-carbon anti-gelling agent approximately two per cent by weight chosen from the group consisting of benzyl alcohol and cyclohexanol.

2. A process for the preparation of jointing composition as claimed in claim 1 wherein the organic oxygenated hydro-carbon anti-gelling agent is benzyl alcohol.

3. A process for the preparation of jointing composition as claimed in claim 1 wherein the organic oxygenated hydro-carbon anti-gelling agent is cyclohexanol.

ALAN THOMAS BARRINGTON
PARKHURST SQUIRES.

REFERENCES CITED

The following references are of record in the file of this patent:

UNITED STATES PATENTS

| Number | Name | Date |
|---|---|---|
| 184,341 | Clark | Nov. 14, 1876 |
| 2,094,590 | Donovan et al. | Oct. 5, 1937 |
| 2,416,504 | Trautman et al. | Feb. 25, 1947 |
| 2,435,124 | Bollinger | Jan. 27, 1948 |

FOREIGN PATENTS

| Number | Country | Date |
|---|---|---|
| 123,114 | Great Britain | Feb. 5, 1919 |